April 28, 1970     M. E. FRIED ET AL     3,508,818
FILM STORAGE AND PROJECTION APPARATUS
Filed Aug. 3, 1967     3 Sheets-Sheet 1
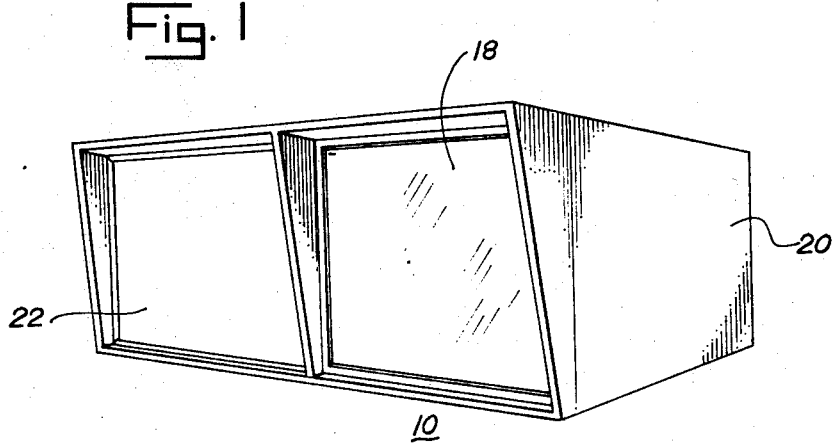
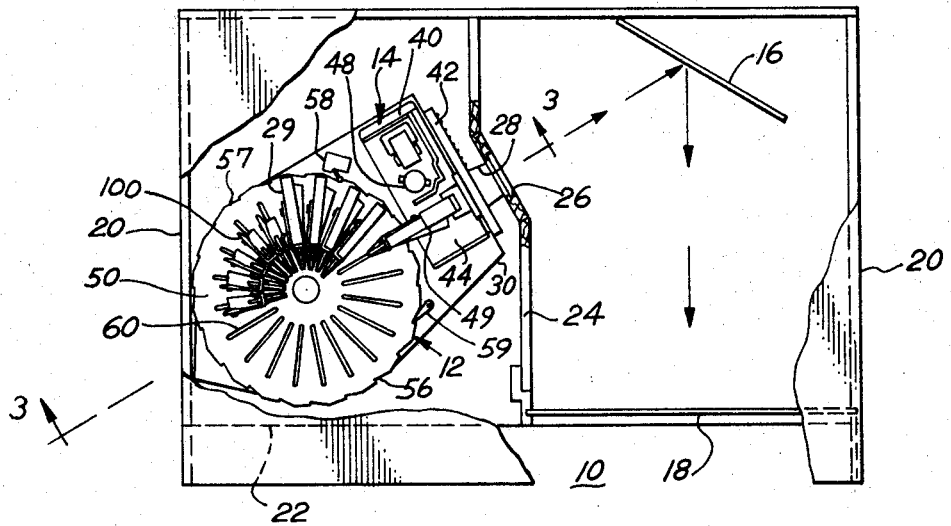
INVENTORS
Mitchel Fried
Wilbur W. Selley
BY
Marvin Chaban
ATTORNEY

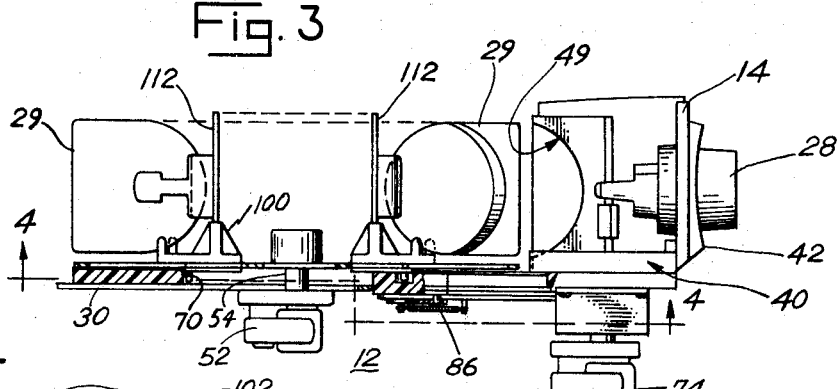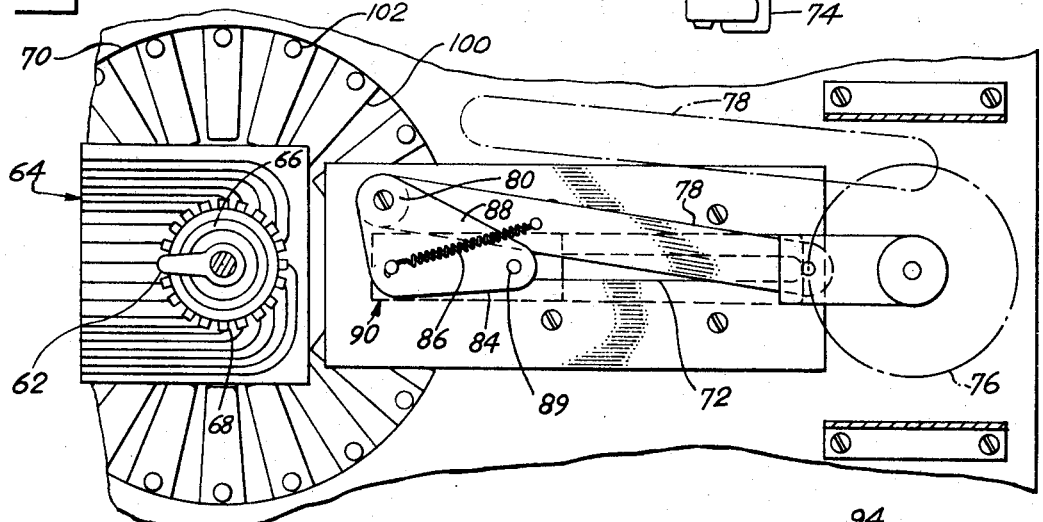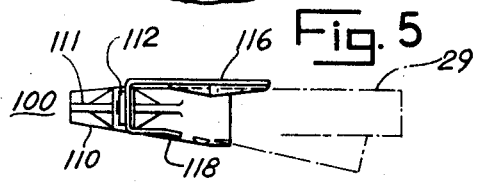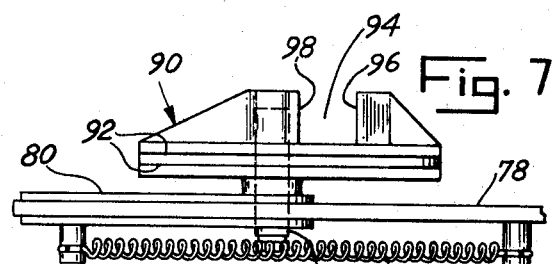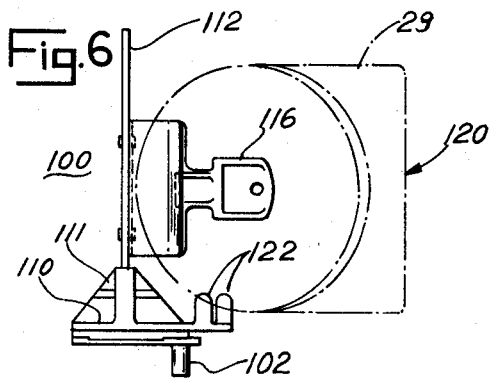

April 28, 1970   M. E. FRIED ET AL   3,508,818
FILM STORAGE AND PROJECTION APPARATUS
Filed Aug. 3, 1967   3 Sheets-Sheet 3
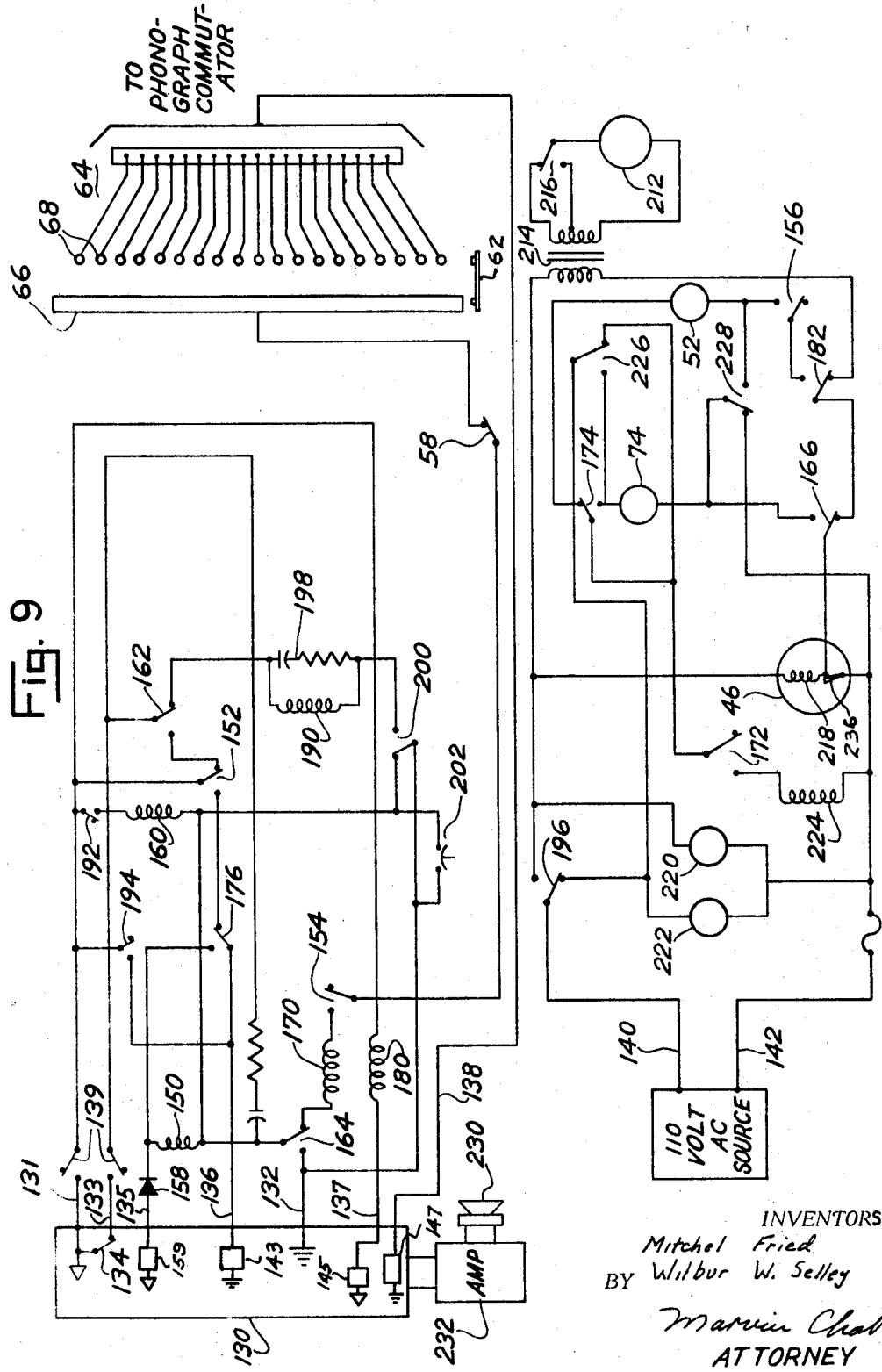
INVENTORS
Mitchel Fried
Wilbur W. Selley
BY
Marvin Chaban
ATTORNEY

United States Patent Office 3,508,818
Patented Apr. 28, 1970

3,508,818
FILM STORAGE AND PROJECTION APPARATUS
Mitchell E. Fried, North Miami Beach, Calif., and Wilbur Webb Selley, Winter Park, Fla.; said Fried assignor, by mesne assignments, to Rowe International, Inc., Whippany, N.J., a corporation of Delaware
Filed Aug. 3, 1967, Ser. No. 659,566
Int. Cl. G03b 21/04
U.S. Cl. 352—123     4 Claims

ABSTRACT OF THE DISCLOSURE

This apparatus has an annular multi-cartridge magazine from which a film cartridge is transported on selection into a film projector for display of its endless loop film on a back-lighted screen. The film selection coincides with the selection of a record on a coin-controlled phonograph or juke box for simultaneous play of both a selected film and record. At the conclusion of play, both record and cartridge are restored to their storage locations with the respective magazines.

BRIEF SUMMARY OF INVENTION

This invention comprises an improvement over the invention of U.S. patent application Ser. No. 441,264 filed Mar. 19, 1965 by Mitchell Fried and Horace Nickerson for Automatic Film Cartridge Selecting and Display Unit.

The earlier invention also provided a film cartridge magazine with a series of single film cartridges spaced radially about the axis of the magazine. The magazine was rotatable in a vertical plane about a horizontal axis. The magazine rested in a normal or home position to which it would be returned after each cycle of operation of the mechanism. A film seelction was made independently of a record selection at the associated juke box. When coinage of the proper amount had been deposited, and a film selection was made, the film magazine rotated from the home position to a position placing the selected film adjacent the projector. The film was injected in a direction parallel to the magazine axis awaiting the start of play of a juke box selection. On completion of play, the film cartridge is retracted to the magazine and the magazine restored to its home position.

The present invention also provides a multi-cartridge film storage magazine and projection system associated with a juke box. The magazine however utilizes a horizontal turntable rotatable about a vertical axis. A combined film and record selection is made at the juke box. The turntable rotates to place the selected cartridge adjacent the projector. The cartridge is slid radially outwardly from the magazine and injected into the projector. At the start of play of the record, the projector operates to project the selected film onto the viewing screen. At the conclusion of play, the cartridge restores to the magazine, and the magazine remains in that position until the next selection is made.

It is therefore an object of the invention to provide a new and improved film storage, transport and projection apparatus.

It is a further object to provide a film cartridge storage and transport system which utilizes an improved horizontal turntable on which the cartridges are mounted for radial outward injection into a projector for play.

It is a further object of the invention to provide an improved film cartridge transport system and improved cartridge injection system.

Other objects, features and advantages of the invention will become apparent from the following detailed description when viewed in conjunction with the accompanying drawings in whch:

FIGURE 1 is a view in perspective of the exterior cabinet housing the film storage and projection apparatus of the invention;

FIGURE 2 is a plan view of the cabinet of FIGURE 1, with the top wall broken away to show the internal components therein;

FIGURE 3 is a side sectional view taken along line 3—3 of FIGURE 2;

FIGURE 4 is a bottom sectional view taken along line 4—4 of FIGURE 3;

FIGURE 5 is a plan view in elevation of a cartridge mounting bracket as used herein;

FIGURE 6 is a side view in elevation of the cartridge mounting bracket of FIGURE 5;

FIGURE 7 is a side view in elevation of the slider member and partial showing of the slider or injection assembly as used herein;

FIGURE 8 is a plan view in elevation of the slider member of FIGURE 7; and

FIGURE 9 is a schematic circuit diagram which can be used in operating the apparatus.

DETAILED DESCRIPTION

In the drawings, FIGURE 1 shows the cabinet 10 housing the film cartridge magazine assembly 12, a projection apparatus 14, a reflective lens system 16, and the back-lighted screen 18. The cabinet 10 is a closed rectangular structure with opaque housing walls 20 at the sides and rear, top and bottom walls (not shown). Across its front, one lateral half has a surface 22 adapted for advertising or display while the remainder of the front is covered by the film screen 18.

Within the cabinet 10, there is a front-to-rear divider wall 24 which separates a section housing the operative assemblies 12 and 14 from a section for transmitting the projected image to the screen for viewing. In the divider wall 24 there is an opening 26 angled from the divider wall proper, the opening accepting and aligning the lens 28 of the projection apparatus 14 relative to the reflective lens 16. The apparatus 14 may be of the type shown in U.S. Patent 3,139,789 for Cartridge Motion Picture Projector issued to C. O. Schrader on July 7, 1964. This apparatus is designed to accept a cartridge 29 of the type shown by the cited Schrader patent to illuminate and drive the endless loop film housed in the cartridge and project the image from the film through the lens 28.

Adjacent the divider wall there is mounted in a substantially horizontal plane the base plate 30 which supports and positions relative to one another the magazine assembly 12 and projection apparatus 14. The projection apparatus 14 will be described only insofar as is necessary to complete the description of remainder of the components of the entire unit. Apparatus 14 is housed on support structure 40 which is generally L-shaped, the vertical wall 42 of the "L" supporting the projecting lens 28. The base wall 44 of the support structure 40 supports the projector film drive motor 46, the projector lamp system 48 and the projecting cartridge retainer 49. Cartridge retainer 49 is shaped to receive and hold a cartridge of the type shown in the cited Schrader patent for projection. The operation of the retainer and its lens system is described also in the Schrader patent cited.

The cartridge magazine assembly 12 has as its main structural component turntable 50. Turntable 50 is mounted for rotation under the control of transport motor 52. Motor 52 includes an integrally mounted speed reduction to rotate its output shaft 54 at approximately 30 r.p.m. The motor is affixed to the underside of base plate 30 with its output shaft 54 extending through the stationary base plate to its drive connection to the turntable 50. The turntable has a circular disc body with equally spaced serrations 56 about its periphery. These serrations each have a comparatively shallow rise and an abrupt declivity to form a series of ratchet teeth 57 about the turntable periphery. These ratchet teeth 57 are sensed by a stationarily mounted miniature snap switch 58 with its operative arm in contact with the teeth. In addition, a spring biased detent 59 contacts the ratchet teeth to aid in stopping the rotation of the turntable 50.

Within the body of turntable 50, there are a series of equally spaced radial slots 60 each terminating at the central opening of the disc body. Each slot 60 extends outwardly to a curved end spaced from the turntable periphery. Each slot is associated and aligned with the adjacent serration 56, there being twenty slots and twenty associated serrations on the turntable to accept and identify twenty cartridges on the turntable.

Mounted on the shaft of the turntable transport motor 52 and rotatable therewith is the rotary wiper 62 of a printed circuit board of the transport control switch 64. This switch has an inner commutative ring 66 and a series of contacts 68 spaced in an annular pattern. Each contact is associated with a particular selection, and each is connected electrically to a like contact on the phonograph search commutator. The relative position of the wiper 62 and the turntable 50 is affixed so the switch 64 can be used to stop the rotation of the turntable when a particular selected cartridge is adjacent the projector, as will be described more fully.

Beneath the turntable axis, the base plate 30 is apertured centrally to provide an annular shoulder 70 approximately midway along the radial extent of slot 60. Within the shoulder 70, there is a single slit 72 aligned with the projector cartridge retainer 49 and leading to the retainer.

Beneath the slit 72 is mounted the cartridge injector mechanism, shown in detail in FIGURE 4. This mechanism is operated by an injection motor 74 whose vertically disposed drive shaft rotates a rotary disc 76 at a reduced speed. Pinned to the periphery of the disc 76 is a crank rod 78 whose remote end is pivotally pinned to a bell crank 80 at the junction of its arms. The shorter arm 84 of crank 80 holds one end of a heavy duty tension spring 86 which is affixed at its other end to the crank rod 78 intermediately along the crank rod length. The tension spring connection normally biases the crank rod 78 and bell crank 80 toward one another. The remote end of the longer arm 88 (of the bell crank) is connected to the upper end of a short vertical pin 89. Pin 89 is rigidly secured at its lower end to one end of a rectangular slider 90. Slider 90 rides within base plate slit 72 in a radial direction. The described cartridge injector and the sprng connections as described, are configured to prevent a cartridge from becoming jammed in the retainer 91, a condition which would disenable the unit. Instead the injector overrides and rejects the jamming cartridge, restoring this cartridge to the magazine, as will be described more fully.

The slider 90 may be fabricated of suitable, tough plastic material such as polytetrafluoroethylene known under the trademark Teflon synthetic resin. Slider 90 as seen best in detail in FIGURES 7 and 8, has inset in both long sides, horizontally extending side channels 92 which mate with the edges of slit 72 to constrain the slider to slide movement along the length of slit 72. On its upper surface, the slider has two spaced abutments with a channel 94 therebetween. One abutment has a funnel or V-shaped mouth 96 leading into the channel 94 at the slider end facing the turntable periphery. The channel at its other end is limited by the inner abutment 98. The slider is normally maintained at its innermost position in the at-rest position of the injection motor as shown in FIGURE 4.

Secured slidably on the turntable within the slots 60 are a series of cartridge holding brackets 100. In FIGURE 2, the turntable is illustrated with some positions having cartridges 29 mounted in brackets 100, some positions having empty brackets 100 and some positions shown with the brackets removed. As set for proper operation, each position would have a bracket 100 bearing a cartridge 29 loaded with film. A representative one of the brackets 100 is seen best in FIGURES 5 and 6. Each bracket 100 has a finger 102 which is sized to extend downwardly through a different slot 60 of the turntable outwardly of the area covered by slider 90. Fingers 102 of the brackets 100 are aligned to pass through slider channel 94 as the turntable rotates, and the finger of a selected cartridge will stop within the channel 94 when the selected cartridge is to be injected into the projector. In their normal, at-rest position, the cartridge holder bracket fingers 102 all rest against and are held inwardly by the base plate annular shoulder 70. Shoulder 70 thus holds the cartridge fingers against outward radial movement except in the area of slit 72 adjacent the projection apparatus.

Each cartridge holder bracket has a slide base 110 from which there arises a vertical column 112. The column is strengthened by a triangular reinforcement 111 at its joinder to base 110. Each column has affixed to its outer side a cartridge clamp 114. This clamp is U-shaped, one leg 116 of which is resilient and biased inwardly toward the other relatively rigid leg 118. The clamp fits about the sides of the body of a cartridge 29 and holds the cartridge about the cartridge axis. With a cartridge held in this manner, the film loop within it is exposed in the area indicated by numeral 120 in a direction radially outwardly on the turntable.

Along its base 110, the cartridge bracket has upstanding fingers 122, offset slightly from one another, which accept and position the base of a cartridge 20 held within holder 100. Below fingers 122, the bracket slide base has inset channels on either side which slidingly mate a cartridge bracket 100 in each slot 60. Thus, in a completed unit there are twenty cartridge brackets 100, one resting for movement in each of the slots 60. Each cartridge bracket 100 has a downwardly extending finger 102, the fingers 102 of the brackets normally being aligned in an annulus inwardly adjacent annular shoulder 70 of the base plate 30.

The circuit diagram of FIGURE 9 shows circuit components necessary to associate the film unit magazine assembly 12 and projection apparatus 14 with a conventional coin-controlled phonograph or juke box indicated as box 130. In such a juke box there are a plurality of records stored in a magazine, each record position in the magazine being represented by a number-digit code combination. A plurality of selector buttons (not shown) is provided, each button associated with a record position. Insertion of coins in the proper amount and depression of a button cause a record to be located in the magazine by a search mechanism. The selected record is moved from the magazine to a record turntable for play of the selected record, as is well-known in the art.

Also extending from juke box 130 to the control section of the film unit, are D.C. source leads 131 and 132. Control lead 133 is connected to lead 131 through a normally closed switch 134 in the phonograph. Other leads to the phonograph include leads 135, 136 and 137. Lead 135 is connected to a control box 159 in the phonograph to receive a D.C. potential. Lead 136 is similarly connected through a control box 143 to receive ground potential. Lead 137 is connected to the control box 145 in the phonograph through which the D.C. potential may be passed. In addition, a cable is designated 138 which has individual conductors each terminating at the individual contacts of the phonograph search control mechanism shown as box 147. The search control mechanism 147 is conventional and each contact is associated with a selector button of the phonograph and energized on selective depression thereof. Conductors of cable 138 are connected to the individual contacts 68 of the cartridge transport control switch 64 to thereby associate the records in the magazine with films in the film magazine 12. Leads 131 and 133 have a manual double pole switch 139 which are closed to activate the unit.

In addition the unit includes a second or power section with the main operative components fed by two leads 140 and 142 which are connected to a conventional source of 110 volts, A.C.

In the control section there are a number of electromagnetic relays each controlling its own sets of contacts. A first relay 150 controls sets of contacts 152, 154 and 156 to initiate the operation of the transport motor. Relay 150 is poled unidirectionally by diode 158 in series with its control winding, such that when control switch 159 in the phonograph closes, the relay is energized. A second relay 160 controls sets of contacts 162, 164 and 166. A third relay 170 operates its contact sets 172, 174 and 176 to control the end of turntable travel. A fourth relay 180 controls a single contact set 182. A final relay 190 controls contact sets 192, 194 and 196 to start the projection cycle. Relay 190 has a series resistance-capacitive network 198 to control the time constant of relay 190.

In addition, the control circuit includes a film sensing switch 200 which senses the notch in the film border indicative of the end of the film in the cartridge. A cancel push button 202 is provided to allow manual operation of the mechanism and to cancel the completion of a cycle. In addition there is a second R-C network 204 which is active to slow the release of relay 160.

The transport control switch 64 has twenty contacts 68 angularly spaced about the rotational path of wiper 62. Each contact is associated with a film cartridge, and each is spaced apart a distance proportional to the distance between cartridges. In addition, switch 64 has an inner commutative ring 66 in contact with wiper 62 on its traverse.

In the A.C. power circuit, there is shown the following: a projector lamp 212 across the secondary of a transformer 214, with a brightness control switch 216 center-tapped across transformer 214. Also there is a turntable motor 52, an injector motor 74, and a projector film motor 46. Motor 46 is thermally protected by winding 218 and contacts 236. Also included are cooling motor 220, standby light 222, and counter 224. The circuit further includes two cartridge position switches, one a homing switch 226, and a second cartridge insert switch 228, both of which physically are located on the injection slider mechanism.

The cabinet 10 may further house a speaker 230 in the space above the turntable. This speaker, if used, is operated from either an auxiliary amplifier 232 or may be directly coupled to the amplifiers in the juke box (not shown). The speaker, of course, transmits music to the surrounding room when the juke box is playing, and is otherwise silent.

OPERATION

In the normal operation of the unit, on-off contacts 139 are closed to tie the film projection unit to the coin-controlled phonograph 130. At this time relay 160 and relay 180 are operated. Relay 160 holds itself operated over a path from positive source lead 131 and contacts 139, 152 and 162, and its own contacts 164 to the common lead 132. Relay 180 holds over a path from source lead 131 and closed switch contacts 139 through lead 137 and closed control 145.

On an insertion of the proper credit and on a selection, the phonograph search system closes the circuit through control 159 to cause the phonograph search mechanism to find the selected record. On finding of the selected record, relay 150 is energized. On energization, relay 150 transfers its contacts 152, 154 and 156. At contacts 152, the operate path to relay 160 is opened. Contacts 154 and 156 prepare a number of circuits for operation. At this time in the phonograph, contacts 134 open to break the alternate operating path to relay 160. Relay 160 becomes de-energized and releases slowly due to the effect of R-C network 204.

When relay 160 has restored, the turntable motor 52 is energized over a path from lead 142 through the normally closed, thermal switch contacts 240 of projector motor 46, contacts 166 (closed to its lower stationary contact), contacts 182 (closed to its upper stationary contact), contacts 156 (closed to its upper stationary contact), motor 52, contacts 174 (closed to its upper stationary contact), contacts 226, and contacts 196 (closed to its lower stationary contact) to source conductor 140. As the turntable rotates, switch 58 opens and closes at each tooth of the turntable periphery. The turntable rotates until wiper 62 reaches the contact 68 selected by the user. As the selected contact is reached, a closed circuit is completed over the selected contact and cable 138 (from the phonograph search mechanism 147) through wiper 62, contacts 58, contacts 154, relay 170, contacts 164 and switch 200 to lead 132 and the D.C. source. Relay 170 operates and opens its contacts 174 to open the operating circuit to the transport motor 52 to stop the rotation of the transport motor at the selected contact. Closure of relay 170 operates counter 224 through contacts 172 to record an added cycle on the counter. Switch 58 closes when an intertooth space in the turntable periphery is reached to align the turntable as the turntable stops rotating.

At this time, the finger 102 of the bracket holding the selected cartridge rests within the channel 94 of slider 90 with the channel funnel end 96 inwardly of the finger 102.

At contacts 174, the injection motor 74 is energized over a path from lead 142, contacts 228, motor 74, contacts 174, contacts 226 and contacts 196 to lead 140. The injection motor 74 rotates its disc 76 to advance the crank rod 78 and slider 90 radially outwardly. The funnel 96 centers itself on the finger 102 and begins to slidably advance the cartridge bracket outwardly along the path of slot 60 in the turntable. The selected cartridge is thereby moved toward the projector and retainer 49. When the selected film cartridge reaches the projector retainer 49, switch 200 reverses to open the operating circuit to relay 160, and at contacts 166 to open the circuit to the injection motor 74.

If as mentioned briefly, the selected cartridge had jammed in its injection path, switch 200 would not be transferred by engagement with the cartridge. Relay 160 remains operated, maintaining contacts 166 closed. Rotation of the injection motor would continue and the cartridge would be retracted toward the magazine by the override of spring 86. As the crank retracts the cartridge, the cartridge reaches its fully retracted position within the magazine and contacts 226 reverse to open the circuit to the transport motor 52. The selection made would be rejected and the inserted credit lost, but the unit would allow other selections to be made.

When the cartridge has properly been advanced into the projector, limit switch 228 reverses to transfer the circuit to injection motor 74 to an alternate path through contacts 156, 182 and 166. When the cartridge is fully inserted, the film edge strikes switch 200 and reverses it to open the circuits to relays 150, 160 and 170. These relays release to open the circuit to the injection motor 74 once the film cartridge fully advanced into the projector. When switch 200 has reversed, a circuit is completed to relay 190. Relay 190 is thereby energized, closing its contacts 192, 194 and 196.

Contacts 196 transfer to de-energize standby lamp 227. Projector drive motor 220 is energized, as is blower motor 220. Transformer 214 is placed across the 110 volt A.C. line to energize the projector lamp 212. The film image is projected onto screen 18, as the selected phonograph record begins to play. The film continues (as the record plays) until the film end notch (not shown) is reached at which time, switch 200 restores to the position shown. Relay 190 holds through its R-C network 198 for a timed period and then restores. Prior to its restoration, relay 190 had closed its contacts 192 to re-energize relay 160. As relay 160 re-energizes it closes contacts 162, 164 and 166. Relay 160 locks itself over its own contacts over a path from lead 131, contacts 152, 162 and switch 200 to lead 132.

In the phonograph, the record having been played is returned to its position in the magazine.

The transfer of contacts 196 (on de-energization of relay 190) inactivates the projector components. Injection motor 74 is re-energized to start the retraction of the played cartridge. Switches 200 and 228 restore once the played cartridge has begun to move from the projector retainer. The injection motor operates the crank mechanism to retract slider 90 and the played cartridge toward the cartridge magazine.

In nomal play, when the cartridge has begun to retract, relay 150 will operate through restored switch 200, and contacts 152 will open the alternate operating path to relay 160 which will release. Motor 74 continues to retract its cartridge until the cartridge reaches its home position in the magazine at which time switch 226 transfers to its normal position de-energizing motor 74. Relay 180 again operates and the unit remains awaiting the next selection.

If the film had ended before the record had completed its play, switch 134 would have closed to re-energize relay 160, transferring its contacts 162 and dropping out relay 190 to end projection. At that time switch 145 closes in the phonograph to operate relay 180 once again.

When standard (non-film) selection is made on the phonograph, control unit 159 remains open and relay 150 is not energized and no film selection or projection takes place.

While there has been described what is at present thought to be the preferred embodiment of the invention, it will be understood that modifications may be made therein and it is intended to cover in the appended claims, all such modifications which fall within the true spirit and scope of the invention.

What is claimed is:

1. An automatic film selection and display unit including:
   a cabinet having a viewing screen in one wall thereof,
   a film projection apparatus disposed to project film stored in a cartridge onto said screen,
   in which the invention comprises:
   (a) an annular storage and transport mechanism comprising a plurality of angularly spaced apart film cartridge-holders, each of which is adapted to hold one of said cartridges,
   (b) means for rotating said mechanism in response to selection of a cartridge for display,
   (c) control means operative to stop the rotation of said mechanism when a selected film cartridge is adjacent said projection apparatus,
   (d) feeding means operative to slidably advance said selected film cartridge and its holder radially outwardly from said adjacent position to a display position relative to said projection apparatus,
      (1) said feeding means normally cooperative with said apparatus to hold said selected film cartridge and holder in the display position such that said projection apparatus can project the image carried by said film onto said view screen,
   (e) control means operative automatically after the film in said selected cartridge has been fully displayed to release the selected cartridge and retract the feeding means to return the cartridge to the mechanism,
   (f) and said feeding means including an override assembly comprising,
      (1) motive linkage operative to advance the selected cartridge into the projection apparatus,
      (2) sensing means for signalling the normal completion of the advance of a selected cartridge into the projection apparatus, and
      (3) means for continuing the movement of said motive linkage on the absence of a signal from said sensing means to automatically retract the selected cartridge to its original position with respect to the mechanism.

2. An automatic film selection and display unit including:
   a cabinet having a viewing screen in one wall thereof,
   a film projection apparatus disposed to project film stored in a cartridge onto said screen,
   in which the invention comprises:
   (a) an annular storage and transport mechanism comprising a rotatable turntable capable of handling thereon a plurality of angularly spaced apart film cartridge-holders, each of which is adapted to hold one of said cartridge in a storage position,
   (b) means for rotating said turntable in response to selection of a cartridge for display,
   (c) control means operative to stop the rotation of said turntable when a selected film cartridge is adjacent said projection apparatus,
   (d) means adjacent said projection apparatus for receiving the holder of the selected cartridge and for aligning said cartridge relative to said apparatus,
   (e) feeding means operative to translate said receiving means and said selected film cartridge radially outwardly from said storage position to a display position relative to said projection apparatus,
      (1) said feeding means cooperative with said apparatus to hold said selected film cartridge in the display position such that said projection apparatus can project the image carried by said film onto said viewing screen, and
   (f) control means operative automatically after the film in said selected cartridge has been fully display to release the selected cartridge and translatably retract the receiving means to return the cartridge to its storage position on the turntable.

3. A film selection and display unit as claimed in claim 2, in which said cartridge holders each grasp the cartridge held therein, and in which the holder of a selected cartridge coacts with said slide means to advance the selected cartridge into the projection apparatus.

4. A film selection and display unit, as claimed in claim 2, in which there are means identifying each of said cartridge positions for selection,
   and position sensing means coactive with said turntable, whereby said identifying means and said position sensing means cooperate to cause the turntable to stop with a selected cartridge aligned with respect to said projection apparatus.

References Cited

UNITED STATES PATENTS 2,625,073   1/1953   Young et al. _____ 352—123
3,383,156   5/1968   Fried et al. _____ 352—123

JULIA E. COINER, Primary Examiner